US012090759B2

(12) United States Patent
Nagahashi et al.

(10) Patent No.: US 12,090,759 B2
(45) Date of Patent: Sep. 17, 2024

(54) LIQUID DISCHARGE HEAD, LIQUID DISCHARGE APPARATUS, AND BONDED UNIT

(71) Applicants: Kazuto Nagahashi, Kanagawa (JP); Hitoshi Usami, Kanagawa (JP)

(72) Inventors: Kazuto Nagahashi, Kanagawa (JP); Hitoshi Usami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 59 days.

(21) Appl. No.: 17/965,805

(22) Filed: Oct. 14, 2022

(65) Prior Publication Data

US 2023/0138126 A1 May 4, 2023

(30) Foreign Application Priority Data

Oct. 29, 2021 (JP) ................................ 2021-177761

(51) Int. Cl.
*B41J 2/14* (2006.01)

(52) U.S. Cl.
CPC ......... *B41J 2/1433* (2013.01); *B41J 2/14233* (2013.01); *B41J 2002/14241* (2013.01)

(58) Field of Classification Search
CPC .................. B41J 2/1433; B41J 2/14233; B41J 2002/14241; B41J 2202/19; B41J 2202/20; B41J 2/161; B41J 2/1623; B41J 2002/14362; B41J 2002/14491
See application file for complete search history.

(56) References Cited

U.S. PATENT DOCUMENTS

2017/0106649 A1* 4/2017 Noguchi .............. B41J 2/14233

FOREIGN PATENT DOCUMENTS

| | | |
|---|---|---|
| JP | 2001-341305 | 12/2001 |
| JP | 2005-125768 | 5/2005 |
| JP | 2009-101645 | 5/2009 |

* cited by examiner

*Primary Examiner* — Thinh H Nguyen
(74) *Attorney, Agent, or Firm* — XSENSUS LLP

(57) ABSTRACT

A liquid discharge head includes a first component having a bonding face having a recess and a second component bonded to the bonding face of the first component. The recess includes a first recess to which an adhesive is applied and a second recess extending in an extending direction to connect the first recess and an outer peripheral end of the first component. The first recess includes an inner side face that is an interior of the first component. The second recess includes a first wall face and a second wall face opposed to the first wall face. The first wall face and the second wall face define side walls of the second recess in a width direction orthogonal to the extending direction of the second recess. The extending direction is inclined with respect to a perpendicular line perpendicular to the inner side face of the first recess.

10 Claims, 11 Drawing Sheets

COMPARATIVE EXAMPLE

COMPARATIVE EXAMPLE

LIQUID DISCHARGE HEAD, LIQUID DISCHARGE APPARATUS, AND BONDED UNIT

CROSS-REFERENCE TO RELATED APPLICATION

This patent application is based on and claims priority pursuant to 35 U.S.C. § 119(a) to Japanese Patent Application No. 2021-177761, filed on Oct. 29, 2021, in the Japan Patent Office, the entire disclosure of which is hereby incorporated by reference herein.

BACKGROUND

Technical Field

Embodiments of the present disclosure relate to a liquid discharge head, a liquid discharge apparatus, and a bonded unit.

Related Art

An inkjet image forming apparatus includes a liquid discharge head constructed of multiple components, such as a nozzle plate and a channel substrate, bonded to each other in layers. These components are bonded to each other with an adhesive such as a thermosetting adhesive.

SUMMARY

Embodiments of the present disclosure describe an improved liquid discharge head (or bonded unit) that includes a first component having a bonding face having a recess and a second component bonded to the bonding face of the first component. The recess includes a first recess to which an adhesive is applied and a second recess extending in an extending direction to connect the first recess and an outer peripheral end of the first component. The first recess includes an inner side face that is an interior of the first component, and the second recess includes a first wall face and a second wall face opposed to the first wall face. The first wall face and the second wall face define side walls of the second recess in a width direction orthogonal to the extending direction of the second recess. The extending direction of the second recess is inclined with respect to a perpendicular line perpendicular to the inner side face of the first recess.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
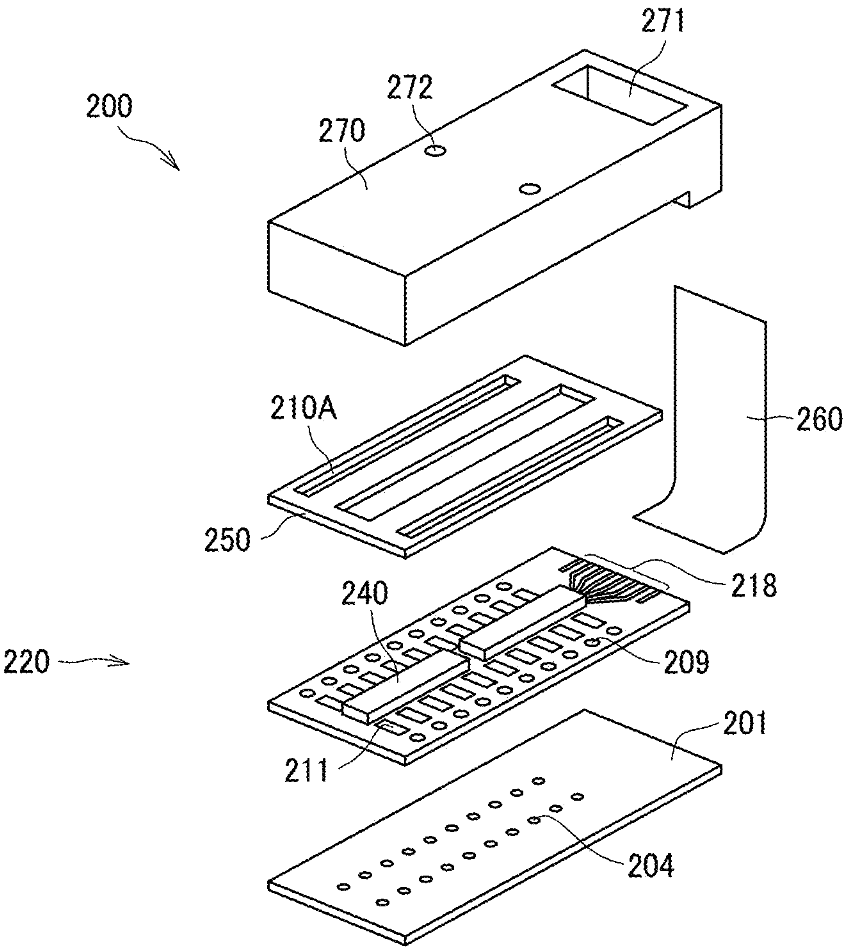
FIG. 1 is an exploded perspective view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
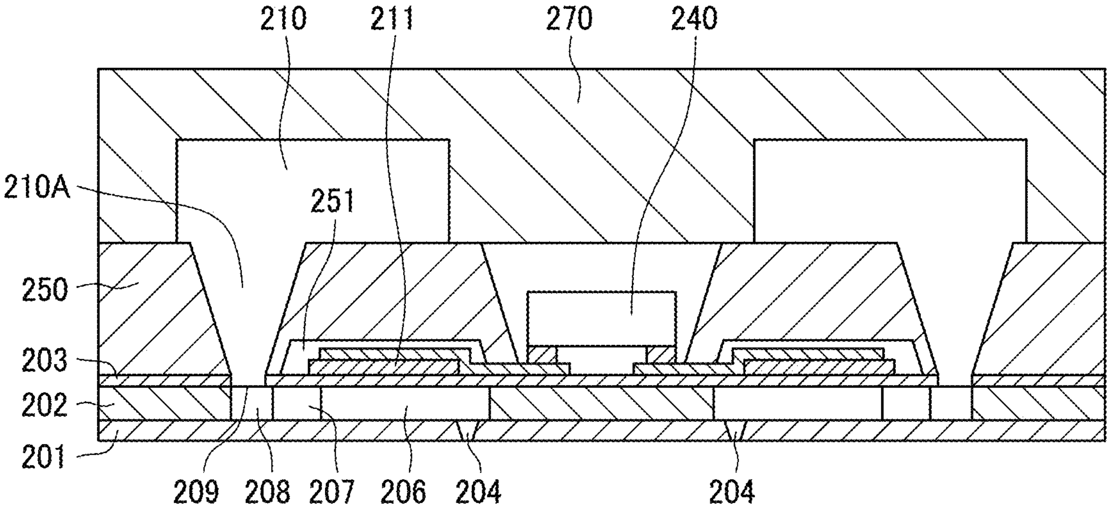
FIG. 2 is a cross-sectional view of the liquid discharge head illustrated in FIG. 1 in a direction perpendicular to a nozzle array direction.
Figure 3:
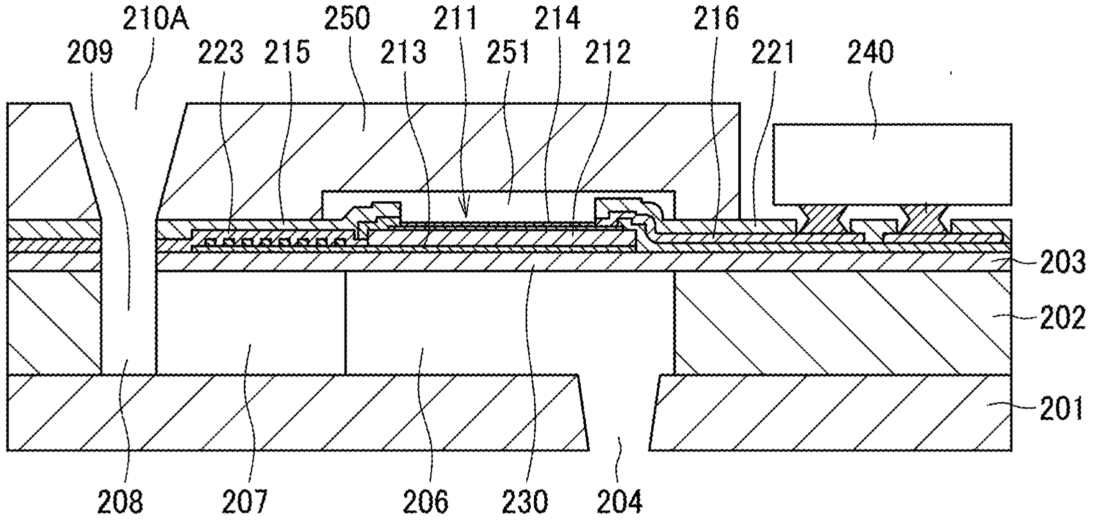
FIG. 3 is an enlarged view of a part of the liquid discharge head in FIG. 2.
Figure 4:
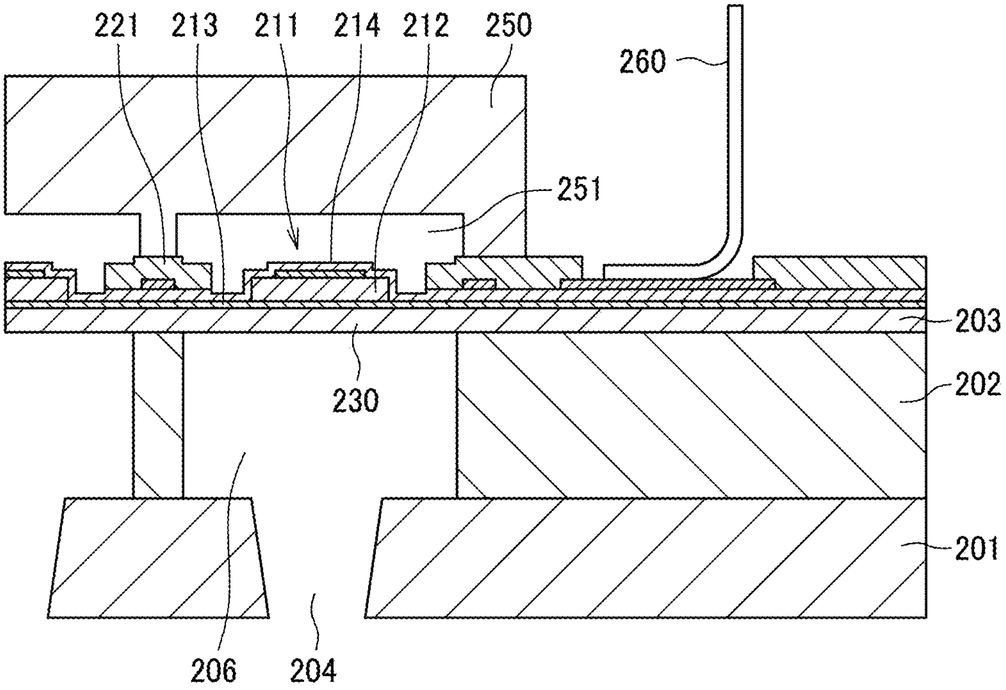
FIG. 4 is a cross-sectional view of the liquid discharge head in the nozzle array direction.

A liquid discharge head 200 according to an embodiment of the present disclosure is described below with reference to FIGS. 1 to 4. Identical reference numerals are assigned to identical components or equivalents and descriptions of those components are simplified or omitted as appropriate. FIG. 1 is an exploded perspective view of the liquid discharge head 200. FIG. 2 is a cross-sectional view of the liquid discharge head 200 in a direction perpendicular to a nozzle array direction. FIG. 3 is an enlarged cross-sectional view of a part of the liquid discharge head 200 illustrated in FIG. 2. FIG. 4 is a cross-sectional view of the part of the liquid discharge head 200 in the nozzle array direction.

As illustrated in FIGS. 1 and 2, the liquid discharge head 200 includes a nozzle plate 201, a channel substrate 202, a diaphragm plate 203, a piezoelectric element 211 serving as a pressure generator, a holding substrate 250, and a frame 270 serving also as a common-chamber substrate. Hereinafter, the liquid discharge head 200 is also simply referred to as a head 200.

In the present embodiment, the channel substrate 202, the diaphragm plate 203, and the piezoelectric element 211 construct an "actuator substrate 220" as an actuator member according to the present disclosure. Note that the actuator substrate 220 does not include the nozzle plate 201, the holding substrate 250, or the frame 270 that is bonded to the actuator substrate 220 after the actuator substrate 220 is formed as an independent component.

The nozzle plate 201 has a plurality of nozzles 204 to discharge liquid. In the present embodiment, the nozzle plate 201 has two nozzle rows, in each of which the nozzles 204 are arranged in a row.

The channel substrate 202, together with the nozzle plate 201 and the diaphragm plate 203, defines an individual liquid chamber 206, a fluid restrictor 207, and a liquid inlet portion 208. The individual liquid chamber 206 communicates with the nozzle 204. The fluid restrictor 207 communicates with the individual liquid chamber 206. The liquid inlet portion 208 communicates with the fluid restrictor 207.

The liquid inlet portion 208 communicates with a common liquid chamber 210 defined by the frame 270 via a passage 209 and a flow path 210A. Liquid is supplied to the common liquid chamber 210 from the outside of the head 200 via a supply port 272. The passage 209 is a liquid supply inlet formed in the diaphragm plate 203, through which the liquid is supplied from the common liquid chamber 210 to the individual liquid chamber 206.

The flow path 210A is a part of the common liquid chamber 210 defined by the holding substrate 250.

As illustrated in FIGS. 3 and 4, the diaphragm plate 203 forms a deformable vibration portion 230 defining a part of the wall of the individual liquid chamber 206. The piezoelectric element 211 and the individual liquid chamber 206 are disposed on opposite sides of the vibration portion 230. The piezoelectric element 211 is attached onto a surface of the vibration portion 230 as a single unit. The vibration portion 230 and the piezoelectric element 211 construct a piezoelectric actuator.

The piezoelectric element 211 includes a lower electrode 213, a piezoelectric layer (piezoelectric body) 212, and an upper electrode 214 laminated in this order on the vibration portion 230. The piezoelectric element 211 is coated with an insulating film 221. The lower electrode 213 as a common electrode for a plurality of piezoelectric elements 211 is connected to a common-electrode power-supply wiring pattern 223 via a common wire 215. The upper electrode 214 as an individual electrode for each piezoelectric element 211 is connected to a driver integrated circuit (IC) 240 via an individual wire 216. The driver IC 240 is mounted on the actuator substrate 220 by, e.g., a flip-chip bonding, to cover an area between rows of the piezoelectric elements 211.

As illustrated in FIG. 1, wires are led out from input/output (I/O) terminals, a power supply terminal, and an input terminal of drive waveforms (drive signals) of the driver IC 240 mounted on the actuator substrate 220 and connected to a connection terminal group 218. Wires of a wiring member 260 such as a flexible printed circuit (FPC) or a flexible flat cable (FFC) are electrically connected to the respective connection terminals of the connection terminal group 218 by anisotropic conductive film (ACF) connection, solder connection, wire bonding, or the like. The other ends of the wires of the wiring member 260 are connected to a controller installed in an apparatus body of a liquid discharge apparatus such as a printer 500 illustrated in FIG. 17. The wiring member 260 is contained in the frame 270 and is led out to the outside of the head 200 through a wiring outlet 271. Each connection terminal of the connection terminal group 218 is flatly disposed at an end of the actuator substrate 220.

The holding substrate 250 is disposed on the actuator substrate 220. The holding substrate 250 has a recess (vibration chamber) 251 that accommodates the piezoelectric element 211. As described above, the holding substrate 250 defines the flow path 210A which is a part of the common liquid chamber 210. The holding substrate 250 is bonded to a surface of the actuator substrate 220 on which the diaphragm plate 203 is disposed with an adhesive.

In the liquid discharge head 200 having the above-described configuration, the driver IC 240 applies a voltage between the upper electrode 214 and the lower electrode 213 of the piezoelectric elements 211 to cause the piezoelectric layer 212 to expand in the direction of lamination of the electrodes, that is, in the direction of the electric field, and to contract in the direction parallel to the vibration portion 230. At that time, the lower electrode 213 is constrained by the vibration portion 230. For this reason, a tensile stress is generated at one side of the vibration portion 230 facing the lower electrode 213, causing the vibration portion 230 to bend toward the other side of the vibration portion 230 facing the individual liquid chamber 206. Accordingly, liquid in the individual liquid chamber 206 is pressurized and discharged from the nozzle 204.

As described above, the nozzle plate 201, the channel substrate 202, the diaphragm plate 203, the holding substrate 250, and the frame 270 are laminated one on another and bonded to each other to construct the liquid discharge head 200. At the time of bonding, these components are temporarily bonded to each other with a light curable adhesive, and subsequently bonded to each other with a final bonding adhesive.

A description is given below of the above-described bonding, for example, the actuator substrate 220 as a first component and the nozzle plate 201 as a second component are bonded to each other.

Figure 5:
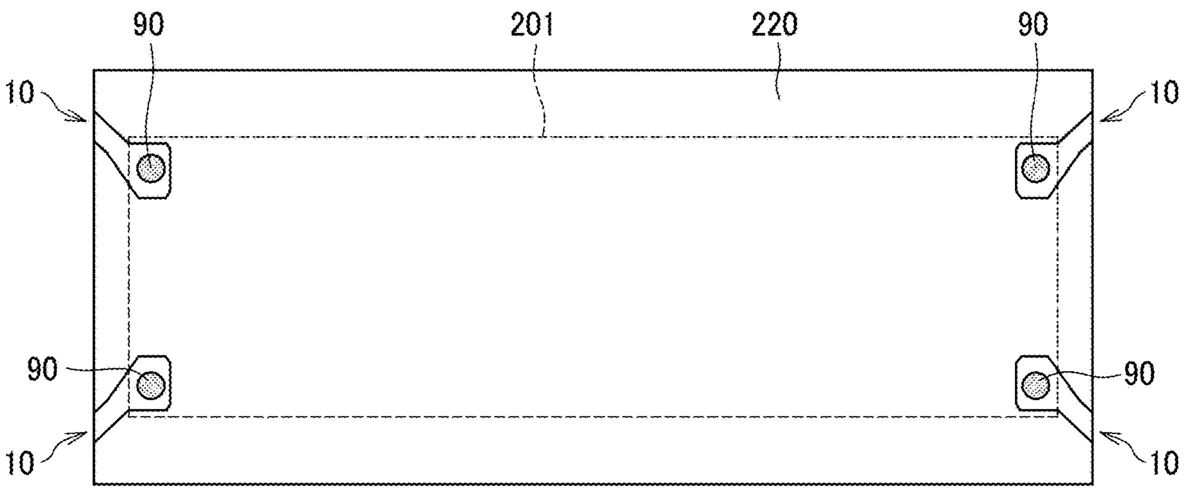
FIG. 5 is a plan view of a nozzle plate bonded to an actuator substrate of the liquid discharge head.

As illustrated in FIG. 5, recesses 10 are disposed at positions corresponding to four corners of the nozzle plate 201 on a surface of the actuator substrate 220 facing the nozzle plate 201 to temporarily bond the nozzle plate 201 to the actuator substrate 220. In other words, the actuator substrate 220 has a bonding face to which the nozzle plate 201 is bonded, and the bonding face has the recesses 10. The bonding face is a surface of the channel substrate 202 of the actuator substrate 220 facing the nozzle plate 201 (see FIG. 2). An outer peripheral end of the actuator substrate 220 described later is an outer peripheral end of the channel substrate 202.

When the actuator substrate 220 and the nozzle plate 201 are bonded to each other, a temporary bonding adhesive 90 is applied to a first recessed portion of the recess 10, which is described later, and the final bonding adhesive is applied to a portion of the actuator substrate 220 to which the nozzle plate 201 is adhered, that is, a portion surrounded by the broken line in FIG. 5, excluding the recess 10. The temporary bonding adhesive 90 is a light curable adhesive that is cured by light such as ultraviolet rays.

As the actuator substrate 220 and the nozzle plate 201 are bonded to each other, the temporary bonding adhesive 90 is held between the actuator substrate 220 and the nozzle plate 201 (see FIG. 7 described later). In this state, the recess 10 is irradiated with light to cure the temporary bonding adhesive 90. As a result, the actuator substrate 220 and the nozzle plate 201 are temporarily bonded to each other. Subsequently, these components (i.e., the actuator substrate 220 and the nozzle plate 201) are heated to cure the final bonding adhesive. As a result, the actuator substrate 220 and the nozzle plate 201 are permanently bonded to each other.

In the temporary bonding using the light curable temporary bonding adhesive 90, the temporary bonding adhesive 90 applied to the recess 10 may be squeezed out of the actuator substrate 220. In addition, the light may not sufficiently reach deep inside the recess 10, that is, a far (inner) side from the outer peripheral end of the actuator substrate 220, causing the insufficient temporary bonding.

The configuration of the recess 10 according to the present embodiment that solves the above situation is described below with reference to FIG. 6. In the present embodiment, since the recesses 10 at the four corners have the same shape, only the recess 10 at the upper right in FIG. 5 is described. Hereinafter, the temporary bonding adhesive 90 is simply referred to as the adhesive 90.

Figure 6:
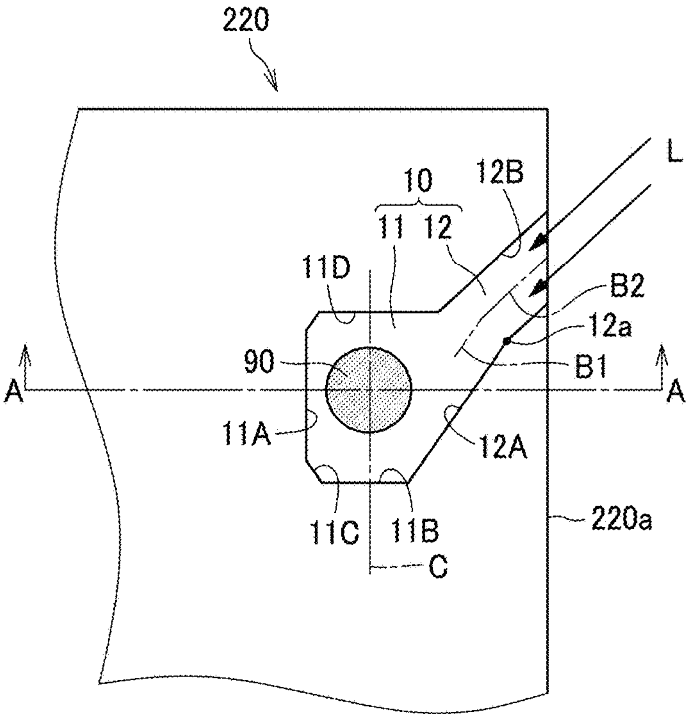
FIG. 6 is a plan view illustrating a recess of the actuator substrate.

As illustrated in FIG. 6, the recess 10 includes a first recessed portion 11 as a first recess and a second recessed portion 12 as a second recess. The adhesive 90 is applied to the first recessed portion 11. The second recessed portion 12 communicates with the first recessed portion 11 and extends to an outer peripheral end 220*a* of the actuator substrate 220. In other words, the second recessed portion 12 extends in an extending direction to connect the first recessed portion 11 and the outer peripheral end 220*a* of the first component. The second recessed portion 12 is a light path to guide ultraviolet (UV) light L into the recess 10.

As described above, the second recessed portion 12 serves as the light path, and the first recessed portion 11 to which the adhesive 90 is applied is farther from the outer peripheral end 220*a* than the second recessed portion 12. Accordingly, the adhesive 90 is prevented from being squeeze out of the outer peripheral end 220*a* of the actuator substrate 220. The second recessed portion 12 extends in an extending direction inclined with respect to an inner side face 11A of the first recessed portion 11, which is an interior of the first component.

The term "the extending direction of the second recessed portion is inclined with respect to the inner side face 11A" means that center lines B1 and B2 connecting centers of the second recessed portion 12 in a width direction of the second recessed portion 12 form an angle with the inner side face 11A, which are not perpendicular to the inner side face 11A, and the center lines B1 and B2 are not parallel to the inner side face 11A in the present embodiment. In other words, the extending directions B1 and B2 of the second recessed portion 12 is inclined with respect to a perpendicular line perpendicular to the inner side face 11A of the first recessed portion 11, which is indicated by line A-A in FIG. 6. Accordingly, the UV light L that enters the second recessed portion 12 is diffusely reflected in the first recessed portion 11, and the entire adhesive 90 can be more uniformly irradiated with the UV light L. Thus, the adhesive 90 is cured in the first recessed portion 11, and the actuator substrate 220 and the nozzle plate 201 can be temporarily bonded with preferable strength.

The inner side face 11A is one of side faces of the first recessed portion 11 on the side opposite to a portion communicating with the second recessed portion 12. In other words, the inner side face 11A is a surface farthest from the portion between the first recessed portion 11 and the second recessed portion 12 communicating with each other among the side faces defining the first recessed portion 11 in the present embodiment. Alternatively, a face 11B, which is another of the side faces of the first recessed portion 11, disposed on a line extended from the center line B1 or B2 of the second recessed portion 12, in particular, the center line B1 which is closest to the first recessed portion 11 may be defined as an inner side face, and the center line B1 or B2 may be inclined with respect to the face 11B. That is, in the present embodiment, the center line B1 or B2 indicating the extending direction of the second recessed portion 12 is inclined with respect to a perpendicular line, which is indicated by line A-A or line C in FIG. 6, perpendicular at least one of the inner side face 11A (i.e., a third wall face) of the first recessed portion 11 opposite to the portion communicating with the second recessed portion 12 or the face 11B (i.e., a fourth wall face adjacent to the third wall face with an angle with the third wall face) on the extended line extended from the center line B1. Hereinafter, the direction of the center lines B1 and B2 connecting the centers of the second recessed portion 12 in the width direction also is referred to as the extending directions B1 and B2 of the second recessed portion 12. The inner side face 11A is parallel to the outer peripheral end 220*a* of the actuator substrate 220. Further, in the present embodiment, the extending directions B1 and B2 of the second recessed portion 12 are inclined with respect to the outer peripheral end 220*a*. The extending directions B1 and B2 of the second recessed portion 12 and the width direction of the second recessed portion 12 are along the bonding face of the actuator substrate 220 to which the nozzle plate 201 is adhered.

As described above, the recess 10 according to the present embodiment prevents the adhesive 90 from being squeezed out and facilitates the adhesive 90 applied in the first recessed portion 11 being sufficiently cured. As a result, as illustrated in FIG. 7, the actuator substrate 220 as the first component and the nozzle plate 201 as the second component are temporarily bonded to construct a bonded unit 300.

In the present embodiment, the second recessed portion 12 is narrower adjacent to the outer peripheral end 220*a* of the actuator substrate 220 than adjacent to the first recessed portion 11 in the width direction of the second recessed portion 12. That is, an inclination angle of a wall face 12A of the second recessed portion 12 on one side changes at an inflection point 12*a* as a boundary, so that the second recessed portion 12 is narrower in the width direction adjacent to the outer peripheral end 220*a* than adjacent to the first recessed portion 11. In other words, the second recessed portion 12 has a narrow part close to the outer peripheral end 220*a* and a wider part closer to the first recessed portion 11 than the narrow part, and the wider part has a width larger than a width of the narrow part in the width direction. Thus, the configuration of the second recessed portion 12 that is narrow adjacent to the outer peripheral end 220*a* further prevents the adhesive 90 from being squeezed. In addition, the configuration of the second recessed portion 12 that is wide adjacent to the first recessed portion 11 facilitates light that enters the second recessed portion 12 being diffused in the recess 10 to sufficiently cure the adhesive 90.

Further, the wall face 12A of the second recessed portion 12 on one side in the width direction deeply extends from the outer peripheral end 220*a* toward the first recessed portion 11 as compared with a wall face 12B on the other side. That is, the wall face 12A (i.e., a first wall face) extending toward the first recessed portion 11 is longer than the wall face 12B (i.e., a second wall face) by a certain distance.

In other words, the second recessed portion 12 includes the first wall face 12A and the second wall face 12B opposed to the first wall face 12A. The first wall face 12A and the second wall face 12B define side walls of the second recessed portion 12 in the width direction orthogonal to the extending direction of the second recessed portion 12. The first wall face 12A and the second wall face 12B extend from the outer peripheral end 220*a* toward the first recessed portion 11, and the first wall face 12A is longer than the second wall face 12B. Thus, the wall face 12A on one side, which is longer than the wall face 12B, guides light incident from the second recessed portion 12 into the first recessed portion 11 along the wall face 12A to facilitate the adhesive 90 in the first recessed portion 11 being cured.

In the present embodiment, an inclined face 11C inclined with respect to each of the inner side face 11A and the face 11B is disposed between the inner side face 11A and the face 11B to connect the inner side face 11A and the face 11B. The inclined face 11C is continuous with the inner side face 11A and face 11B. In other words, the first recessed portion 11 has a shape such that a corner where the inner side face 11A and the face 11B intersect with each other is chamfered by the inclined face 11C.

The inclined face 11C further diffuses the UV light L in the first recessed portion 11. Although the relation between the inner side face 11A and the face 11B has been described above, the inner side face 11A is also continuous with a face 11D via an inclined face on the other side. The faces 11B and 11D (i.e., continuous faces) are continuous with the second recessed portion 12. That is, the face 11B is connected to the first wall face 12A, and the face 11D is connected to the second wall face 12B.

The extending direction B1 or the extending direction B2 of the second recessed portion 12 is preferably inclined with respect to the perpendicular line of each side face (i.e., the inner side face 11A, the face 11B, or the face 11D) of the first recessed portion 11. Thus, the UV light is diffusely reflected in the first recessed portion 11 to cure the adhesive 90 in the first recessed portion 11. All the side faces of the first recessed portion 11 described above do not include a narrow chamfered face, for example, corresponding to the corner between the inner side face 11A and the face 11B, such as the inclined face 11C described above. However, the extending directions B1 or B2 of the second recessed portion 12 may be inclined with respect to a perpendicular line perpendicular to the inclined face 11C or the like. The side faces of the first recessed portion 11 extend in a direction in which the first component and the second component are bonded to each other, that is, in the direction perpendicular to the surface of the paper on which FIG. 6 is drawn. However, the direction may not be strictly perpendicular.

Figure 8:
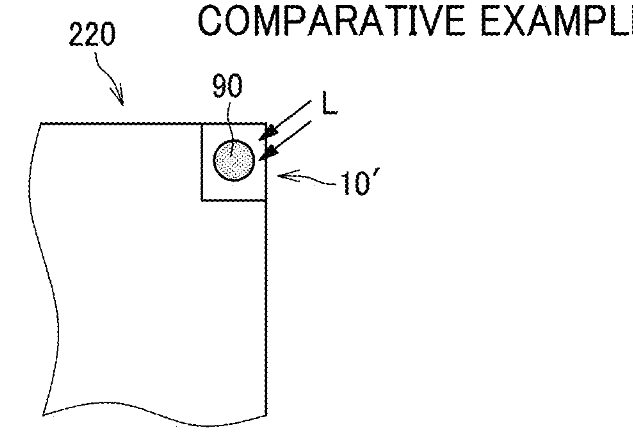
FIG. 8 is a plan view illustrating a recess of the actuator substrate according to Comparative Example 1 different from the present embodiment.
Figure 9:
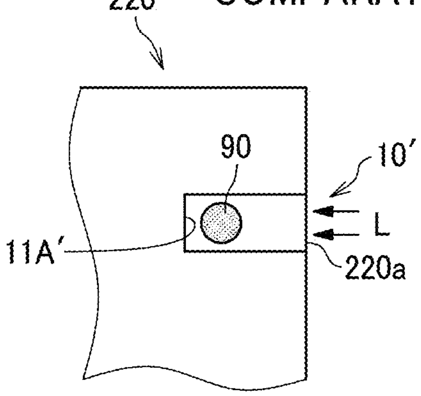
FIG. 9 is a plan view illustrating a recess of the actuator substrate according to Comparative Example 2 different from the present embodiment.

A description is given below of experiment results indicating the effect of the recess 10 according to the present embodiment that prevents the adhesive 9) from being squeezed out and facilitates the adhesive 90 being cured. In the experiment, the effect is compared between "the present embodiment" including the recess 10 having the configuration illustrated in FIG. 6 and, "Comparative Example 1" and "Comparative Example 2" including recesses having configurations different from the present embodiment. As illustrated in FIG. 8, a recess 10' in Comparative Example 1 does not includes the second recessed portion 12, and the portion to which the adhesive 90 is applied is open on two sides of the outer peripheral end of the actuator substrate 220. As illustrated in FIG. 9, in a recess 10' in Comparative Example 2, the extending direction of the portion corresponding to the second recessed portion 12 according to the present embodiment is perpendicular to the inner side face 11A' farthest from the outer peripheral end 220*a* of the actuator substrate 220.

In the present embodiment, Comparative Example 1, and Comparative Example 2, the adhesive 90, which is UV curable (also referred to as the UV adhesive 90), was applied to the first recessed portion 11, the actuator substrate 220 and the nozzle plate 201 were bonded to each other, and the UV adhesive 90 in the first recessed portion was irradiated with the UV light L. After a predetermined time elapsed to cure the UV adhesive 90, an "average cured proportion of the UV adhesive 90" and an "occurrence rate of the squeezed out UV adhesive 90" were measured. In each of the present embodiment, Comparative Example 1, and Comparative Example 2, the number of samples N was 24.

Specifically, the experiment was performed as follows. First, in each of the present embodiment, Comparative Example 1, and Comparative Example 2, the UV adhesive 90 was applied to the actuator substrate 220 in a circular shape with substantially the same amount and the same diameter as viewed from above as illustrated in FIGS. 6, 8, and 9. Then, the actuator substrate 220 and the nozzle plate 201 were bonded to each other, and the UV adhesive 90 was irradiated with the UV light L. After the predetermined time elapsed to cure the UV adhesive 90, the bonded portion was visually observed from the nozzle plate 201 side to confirmed whether the UV adhesive 90 was squeezed out. The occurrence rate of the squeezed out UV adhesive was calculated by dividing the number of samples in which the UV adhesive 90 was squeezed out by the number of samples N (i.e., 24).

Thereafter, the actuator substrate 220 was separated from the nozzle plate 201. The bonded portion of the actuator substrate 220 to which the UV adhesive 90 was applied was cleaned to remove the uncured UV adhesive 90. An image of the actuator substrate 220 was captured in the direction in which the nozzle plate 201 was bonded, that is, in the direction perpendicular to the surface of the paper on which FIG. 6 is drawn to measure the shape of the cured UV adhesive 90. An area of the circular shape was defined as 100%, and a proportion of an area where the UV adhesive remains was calculated. The proportions were averaged over 24 samples to calculate the average cured proportion of the UV adhesive 90. The experiment results conducted by the above-described method are illustrated in Table 1.

TABLE 1

| | AVERAGE CURED PROPORTION OF UV ADHESIVE [%] | OCCURRENCE RATE OF SQUEEZED OUT UV ADHESIVE [%] |
|---|---|---|
| PRESENT EMBODIMENT | 100 | 0 |
| COMPARATIVE EXAMPLE 1 | 91 | 16.7 |
| COMPARATIVE EXAMPLE 2 | 70 | 0 |

As illustrated in Table 1, in the present embodiment, the average cured proportion of the UV adhesive 90 was highest, i.e., 100%, and the occurrence rate of the squeezed out UV adhesive 90 was lowest, i.e., 0%. In Comparative Example 1, the cured proportion was 91%, which was relatively high, but the occurrence rate of the squeezed out UV adhesive 90 was 16.7%, that is, the UV adhesive 90 was squeezed out. Since the recess 10' does not include the second recessed portion 12 as illustrated in FIG. 8, the UV light L is likely to be widely diffused in the recess 10', but the UV adhesive 90 is likely to be squeezed out. In Comparative Example 2, the UV adhesive 90 was not squeezed out, but the cured proportion was low, i.e., 70%. In Comparative Example 2, as illustrated in FIG. 9, although the passage portion corresponding to the second recessed portion 12 prevents the UV adhesive 90 from being squeezed out, the UV light L may not be sufficiently diffused in the portion corresponding to the first recessed portion 11 since the extending direction of the passage portion is perpendicular to the inner side face 11A', and the UV adhesive 90 may not be sufficiently cured.

As described above, the configuration of the recess 10 according to the present embodiment, specifically, the configuration in which the recess 10 includes the second recessed portion 12 extending in the extending direction inclined with respect to the inner side face 11A prevents the UV adhesive 90 from being squeezed out and facilitates the UV adhesive 90 being sufficiently cured.

Figure 7:
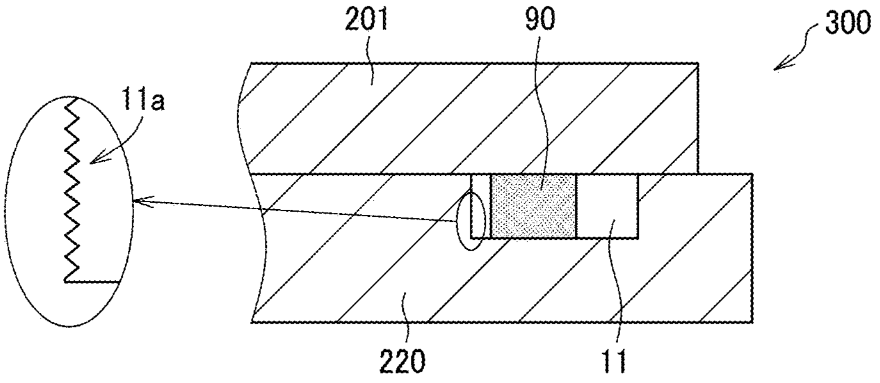
FIG. 7 is a cross-sectional view of the nozzle plate and the actuator substrate along line A-A in FIG. 6.

As illustrated in FIG. 7, the inner side face 11A has asperities which undulate in the vertical direction in FIG. 7. Accordingly, the UV light L can be further diffused in the first recessed portion 11. Alternatively, the inner side face 11A may have asperities which undulate in the width direction (the vertical direction in FIG. 6 and the direction perpendicular to the surface of the paper on which FIG. 7 is drawn), or other faces of the first recessed portion 11 and the second recessed portion 12 (e.g., the faces 11B, 11C, and 11D, the first wall face 12A, or the second wall face 12B) may have asperities. With such a configuration, light can be further diffused in the recess 10.

Modifications of the recess 10 are described below.

Figure 10:
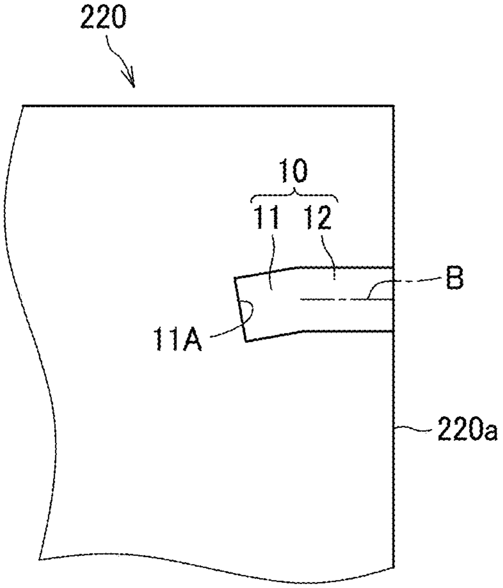
FIG. 10 is a plan view illustrating a recess of the actuator substrate according to another embodiment of the present disclosure.

In the recess 10 illustrated in FIG. 10, for example, an extending direction B of the second recessed portion 12 is substantially parallel to the outer peripheral end of the actuator substrate 220 extending in the left-and-right direction in FIG. 10 (and perpendicular to the outer peripheral end 220*a* of the actuator substrate 220). On the other hand, the first recessed portion 11 is inclined with respect to the outer peripheral end 220*a* of the actuator substrate 220. As a result, the extending direction B of the second recessed portion 12 is inclined with respect to the inner side face 11A of the first recessed portion 11.

Figure 11:
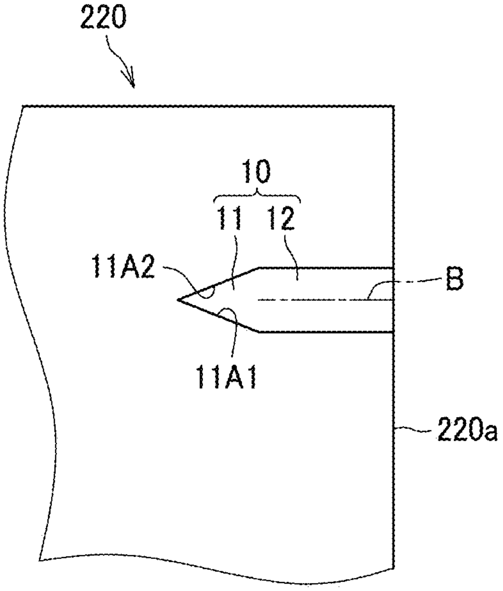
FIG. 11 is a plan view illustrating a recess of the actuator substrate according to still another embodiment of the present disclosure.

The shape of the first recessed portion 11 is not limited to a rectangle, and as illustrated in FIG. 11, inner side faces 11A1 and 11A2 are inclined with respect to the outer peripheral end 220*a* of the actuator substrate 220. As a result, the extending direction B of the second recessed portion 12 is inclined with respect to the inner side faces 11A1 and 11A2.

Figure 12:
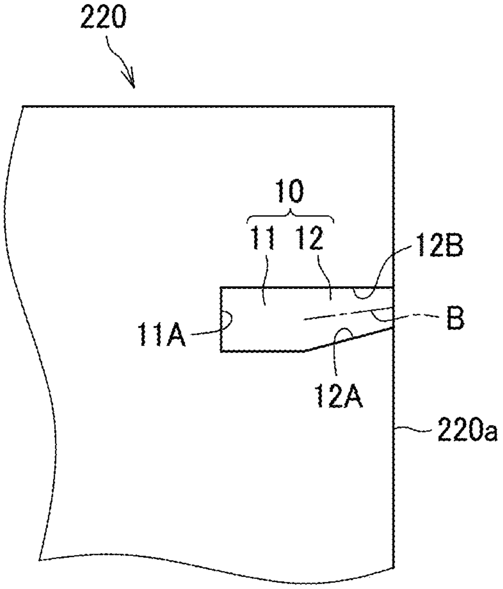
FIG. 12 is a plan view illustrating a recess of the actuator substrate according to yet another embodiment of the present disclosure.

In FIG. 12, the one wall face 12A of the second recessed portion 12 is inclined with respect to the inner side face 11A, but the other wall face 12B is substantially perpendicular to the inner side face 11A. Also in this case, the extending direction B of the second recessed portion 12 is inclined with respect to the inner side face 11A.

Also in the above embodiments, the configuration in which the extending direction B of the second recessed portion 12 is inclined with respect to the inner side face 11A facilitates the UV adhesive 90 being sufficiently cured.

Figure 13:
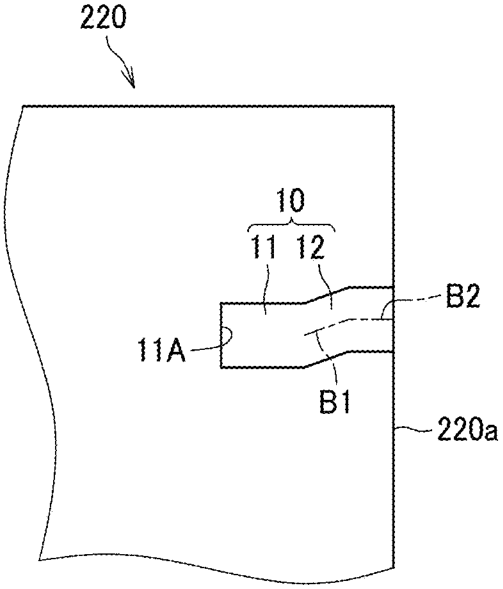
FIG. 13 is a plan view illustrating a recess of the actuator substrate according to still yet another embodiment of the present disclosure.

The extending direction of the entire second recessed portion 12 is not necessarily inclined with respect to the inner side face 11A. For example, in FIG. 13, the extending direction B2 of the second recessed portion 12 adjacent to the outer peripheral end 220*a* is substantially perpendicular to the inner side face 11A, but the extending direction B1 of the second recessed portion 12 adjacent to the first recessed portion 11 is inclined with respect to the inner side face 11A. Accordingly, the UV adhesive 90 applied to the first recessed portion 11 can be sufficiently cured. In particular, the configuration in which the extending direction B1 of the second recessed portion 12 adjacent to the first recessed portion 11 is inclined with respect to the inner side face 11A is more effective to cure the UV adhesive 90 than the configuration in which the extending direction B2 is inclined with respect to the inner side face 11A.

The configurations of the recesses 10 illustrated in FIGS. 10 to 13 can be combined. For example, the first recessed portion 11 having the shape illustrated in FIG. 11 and the second recessed portion 12 illustrated in FIG. 13 may be combined.

Figure 14:
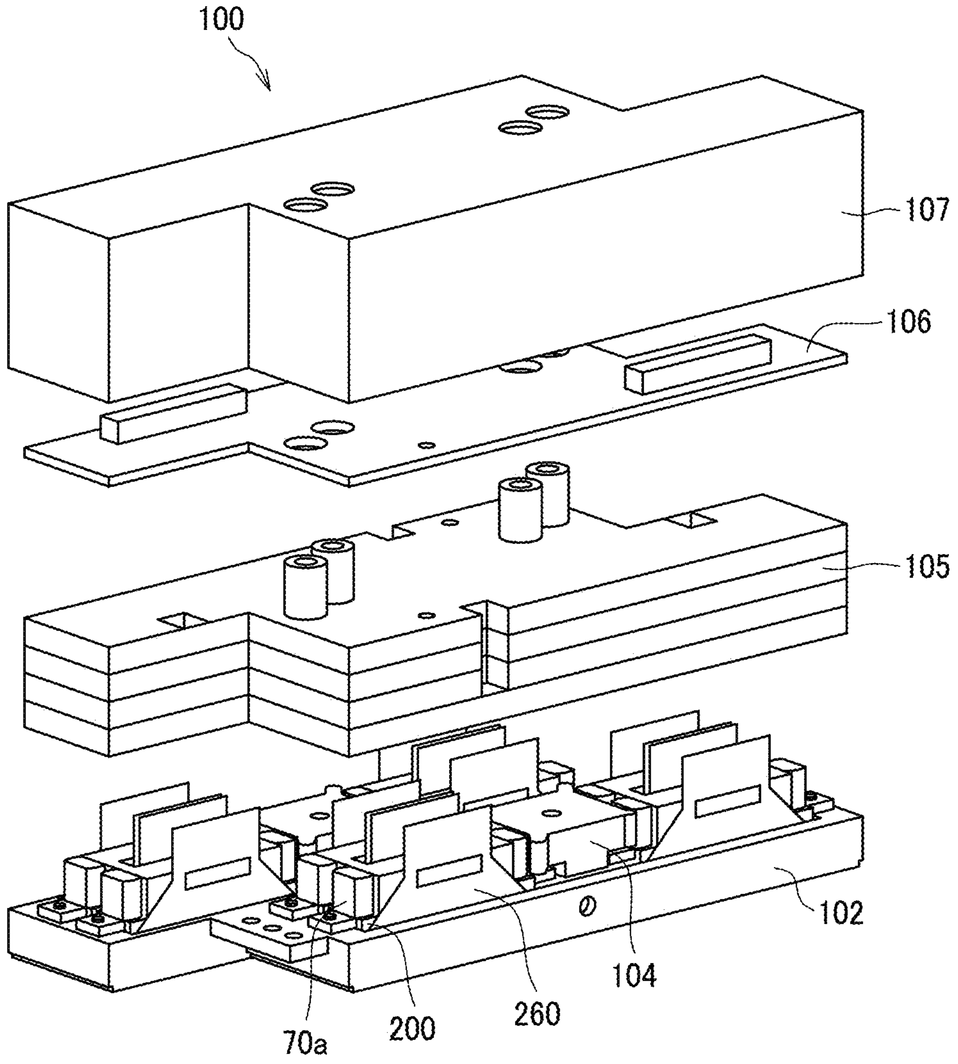
FIG. 14 is an exploded perspective view of a head module according to embodiments of the present disclosure.
Figure 15:
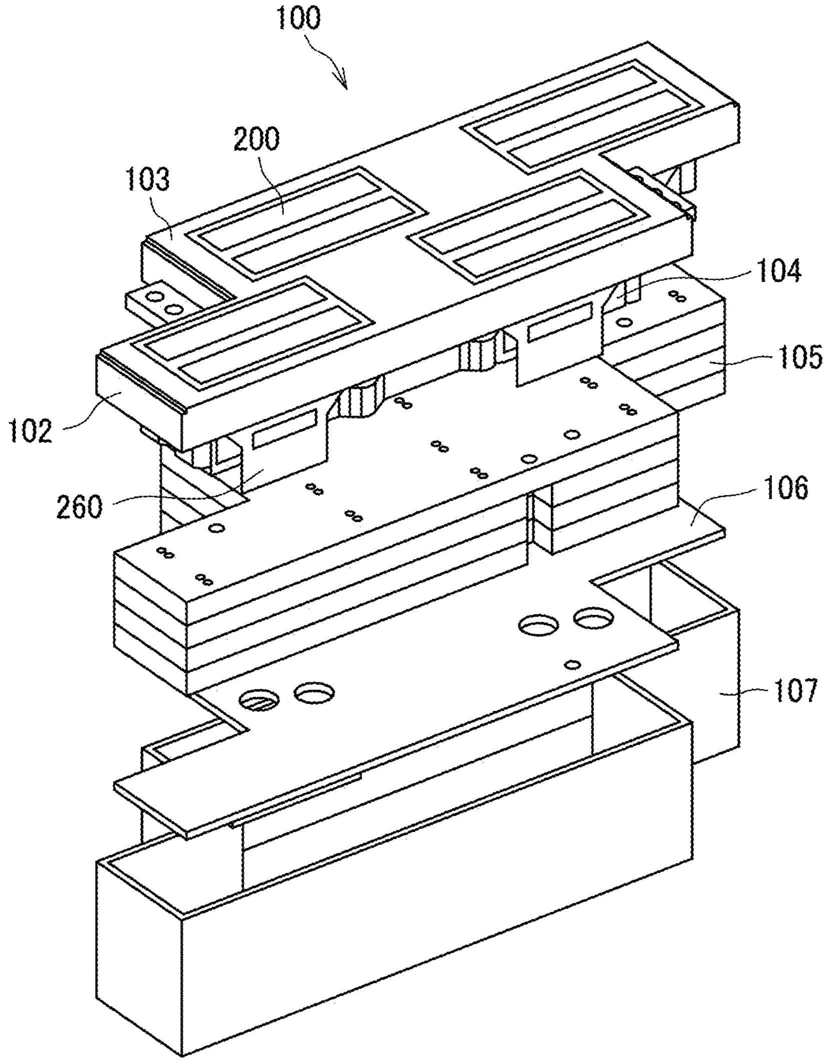
FIG. 15 is an exploded perspective view of the head module viewed from a nozzle surface side thereof.
Figure 16:
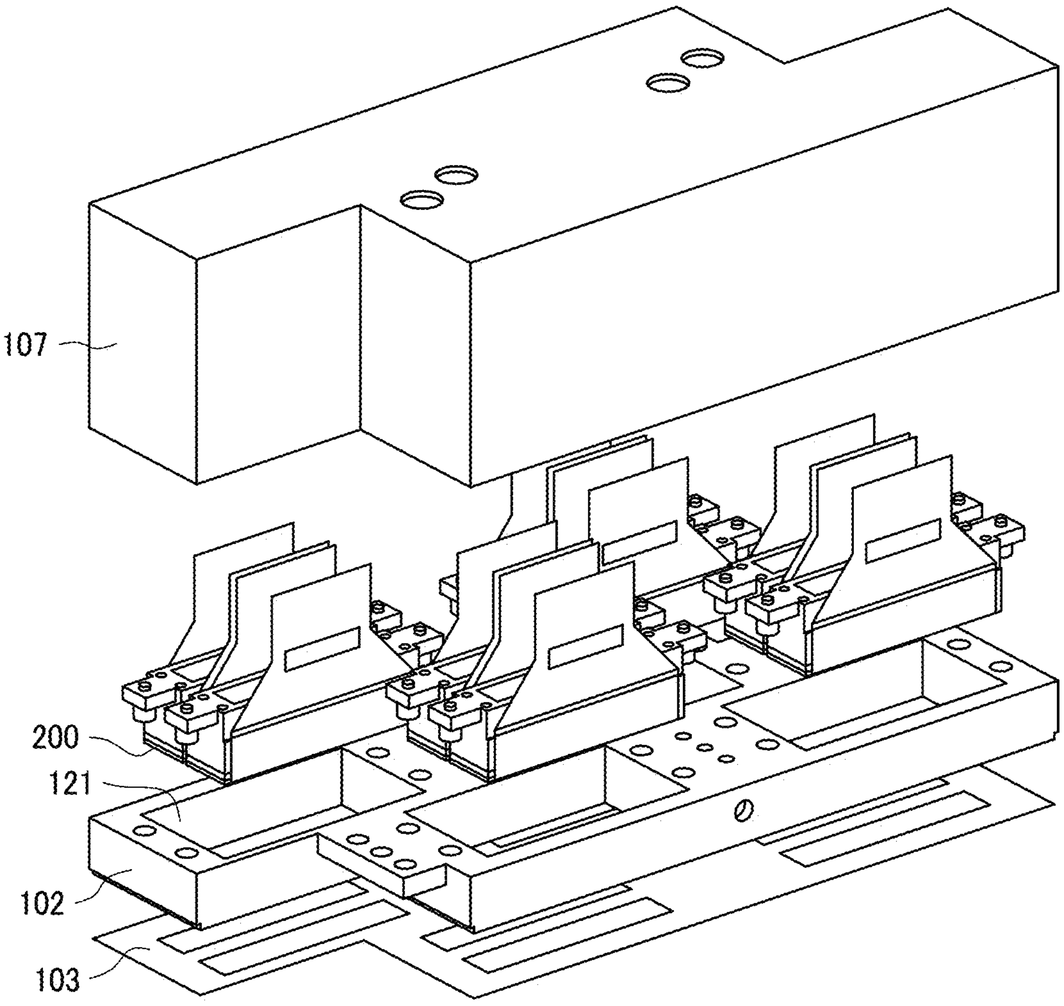
FIG. 16 is an exploded perspective view of a head, a base, and a cover of the head module.

A head module 100 according to the present embodiment including the above-described liquid discharge head 200 is described below with reference to FIGS. 14 to 16. FIG. 14 is an exploded perspective view of the head module 100. FIG. 15 is an exploded perspective view of the head module 100 viewed from a nozzle surface side, on which the plurality of nozzles 204 is disposed, of the head module 100. FIG. 16 is an exploded perspective view of the head 200, a base 102, and a cover 103 of the head module 100.

The head module 100 includes a plurality of heads 200 as liquid discharge heads to discharge liquid, the base 102, the cover 103, a heat radiator 104, a manifold 105, a printed circuit board (PCB) 106, and a module case 107. In the present embodiment, the head module 100 includes eight heads 200 as an example, but embodiments of the present disclosure are not limited thereto. The PCB 106 and the piezoelectric element of the head 200 are connected via the flexible wiring member 260.

In the present embodiment, the plurality of heads 200 are mounted with a space therebetween onto the base 102. The head 200 is inserted into an opening 121 in the base 102, and the peripheral end of the nozzle plate 201 of the head 200 is bonded to the cover 103 bonded and secured to the base 102 to attach the head 200 to the base 102. A flange 70*a* provided outside the head 200 is bonded and secured to the base 102. The head 200 is secured to the base 102 by, but not limited to, bonding, swaging, crimping, riveting, screwing, or the like.

Figure 17:
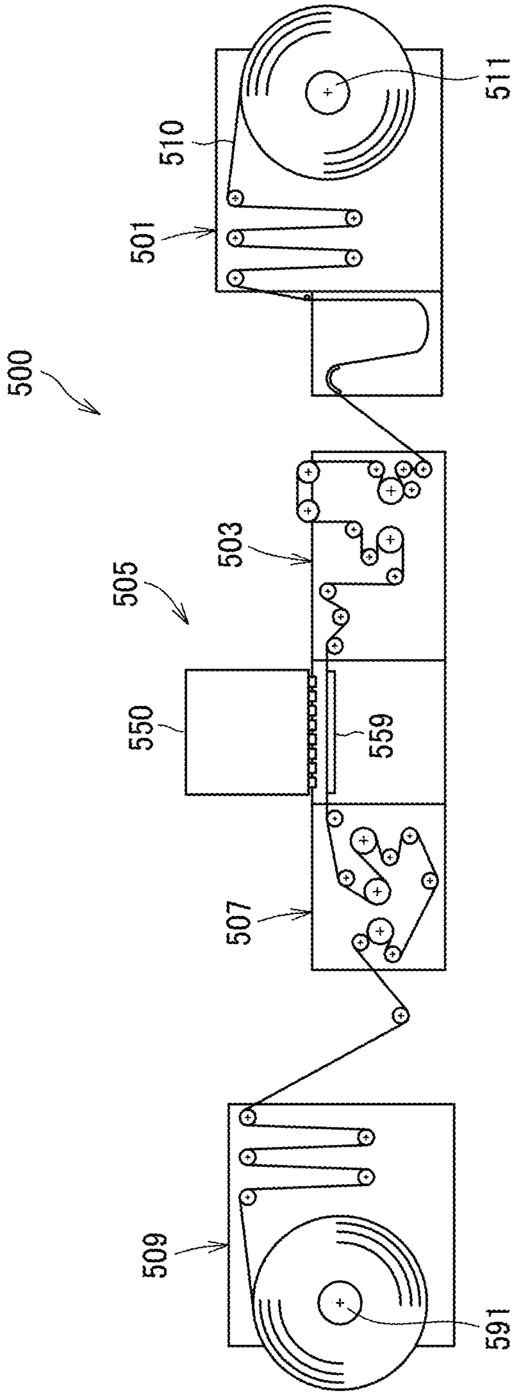
FIG. 17 is a schematic view of a liquid discharge apparatus according to embodiments of the present disclosure.
Figure 18:
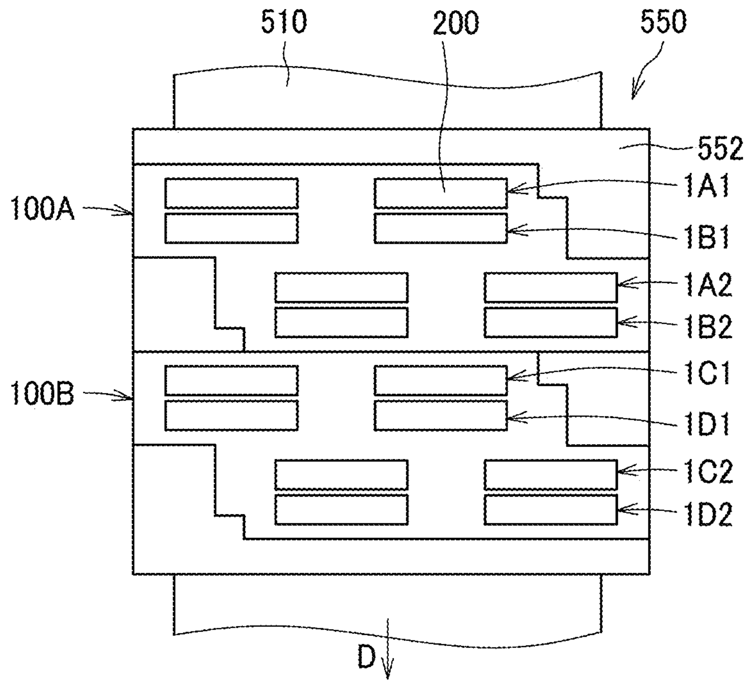
FIG. 18 is a plan view of a head unit of the liquid discharge apparatus.

An example of a liquid discharge apparatus according to the present embodiment is described below with reference to FIGS. 17 and 18. FIG. 17 is a schematic view of the liquid discharge apparatus. FIG. 18 is a plan view of a head unit of the liquid discharge apparatus illustrated in FIG. 17.

The printer 500 as a liquid discharge apparatus includes a loading device 501, a guide conveyor 503, a printing device 505, a drying device 507, and an ejection device 509. The loading device 501 carries a continuous medium 510 such as continuous paper or a continuous sheet into the printer 500. The guide conveyor 503 guides and conveys the continuous medium 510 from the loading device 501 to the printing device 505. The printing device 505 discharges liquid onto the continuous medium 510 to form (print) an image. The drying device 507 dries the continuous medium 510. The ejection device 509 carries out the continuous medium 510.

The continuous medium 510 is fed from a winding roller 511 of the loading device 501 to the downstream side. Then, the continuous medium 510 is guided and conveyed with rollers of the loading device 501, the guide conveyor 503, the drying device 507, and the ejection device 509, and wound around a take-up roller 591 of the ejection device

509. In the printing device 505, the continuous medium 510 is conveyed on a conveyance guide 559 so as to face ahead unit 550. The head unit 550 discharges liquid onto the continuous medium 510 to form an image.

As illustrated in FIG. 18, the head unit 550 includes two head modules 100A and 100B according to the present embodiment on a common base 552. The head module 100A includes head arrays 1A1, 1A2, 1B1, and 1B2. Each of the head arrays 1A1, 1A2, 1B1, and 1B2 includes multiple liquid discharge heads 200 (two heads 200 in the present embodiment) arranged in a head array direction perpendicular to a conveyance direction of the sheet P indicated by arrow D in FIG. 18. The head module 100B includes head arrays 1C1, 1C2, 1D1, and 1D2. Each of the head arrays 1C1, 1C2, 1D1, and 1D2 includes multiple liquid discharge heads 200 arranged in the head array direction perpendicular to the conveyance direction of the sheet P. The head arrays 1A1 and 1A2 of the head module 100A discharge liquid of the same color. Similarly, the head arrays 1B1 and 1B2 of the head module 100A are grouped as one set and discharge liquid of the same desired color. The head arrays 1C1 and 1C2 of the head module 100B are grouped as one set and discharge liquid of the same desired color. The head arrays 1D1 and 1D2 of the head module 100B are grouped as one set and discharge liquid of the same desired color.

The head module according to the present disclosure can be formed together with functional parts and mechanisms as a single unit (integrated unit) to construct a liquid discharge unit. For example, the head module may be combined with at least one of the configurations of a head tank, a carriage, a supply unit, a maintenance unit, a main scanning moving unit, or a liquid circulation device.

Examples of the "single unit" include a combination in which the head module and one or more functional parts and mechanisms are secured to each other through, e.g., fastening, bonding, or engaging, and a combination in which one of the head module and the functional parts and mechanisms is movably held by another. Further, the head module, the functional parts, and the mechanisms may be detachably attached to each other.

The term "liquid discharge apparatus" used in the present disclosure includes an apparatus including the head module or the liquid discharge unit to drive the liquid discharge head to discharge liquid. The term "liquid discharge apparatus" used here includes, in addition to apparatuses to discharge liquid to materials onto which liquid can adhere, apparatuses to discharge the liquid into gas (air) or liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a paper sheet to apply the treatment liquid to the surface of the paper sheet, for reforming the surface of the paper sheet, and an injection granulation apparatus that injects a composition liquid, in which a raw material is dispersed in a solution, through a nozzle to granulate fine particle of the raw material.

Liquid to be discharged through the nozzles of the liquid discharge head is not limited to a particular liquid as long as the liquid has a viscosity or surface tension to be discharged from the liquid discharge head. However, preferably, the viscosity of the liquid is not greater than 30 mPa·s under ordinary temperature and ordinary pressure or by heating or cooling. Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and a counter electrode.

The terms "image formation," "recording," "printing," "image printing," and "fabricating" used in the present embodiments may be used synonymously with each other.

Although the several embodiments of the present disclosure have been described above, the present disclosure is not limited to the embodiments described above, and various modifications and changes can be made without departing from the scope of the present disclosure.

In the above-described embodiments, examples of the first component and the second component of the liquid discharge head are the actuator substrate 220 and the nozzle plate 201, respectively, but the present disclosure is not limited thereto. Examples of the first component and the second component include a channel substrate, a diaphragm plate, a common-chamber substrate, a frame, and other components of the liquid discharge head to be bonded to each other. Further, the present disclosure is not limited to the liquid discharge head in which the first component and the second component are bonded to each other, and can be applied to other bonded units in which a first component and a second component are bonded to each other.

In the above-described embodiment, the recess is disposed only on the first component, but the recess may be disposed on both the first component and the second component.

As described above, according to the present disclosure, the components can be appropriately bonded to each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:
a first component having a bonding face having a recess; and
a second component bonded to the bonding face of the first component,
wherein the recess includes:
a first recess to which an adhesive is applied, the first recess including an inner side face that is an interior of the first component; and
a second recess extending in an extending direction to connect the first recess and an outer peripheral end of the first component,
the second recess including:
a first wall face; and
a second wall face opposed to the first wall face,
the first wall face and the second wall face defining side walls of the second recess in a width direction orthogonal to the extending direction of the second recess, and
the extending direction of the second recess being inclined with respect to a perpendicular line perpendicular to the inner side face of the first recess.

2. The liquid discharge head according to claim 1,
wherein the inner side face has:
a third wall face; and
a fourth wall face adjacent to the third wall face with an angle with the third wall face,
the extending direction being inclined with respect to a perpendicular line perpendicular to at least one of the third wall face or the fourth wall face.

3. The liquid discharge head according to claim 2,
wherein the first wall face and the second wall face extend from the outer peripheral end toward the first recess, and
the first wall face is longer than the second wall face.

4. The liquid discharge head according to claim 3,
wherein the first recess further includes an inclined face between the third wall face and the fourth wall face to connect the third wall face and the fourth wall face,
the inclined face is inclined with respect to each of the third wall face and the fourth wall face, and
the fourth wall face is connected to the first wall face of the second recess.

5. The liquid discharge head according to claim 4,
wherein the extending direction of the second recess is inclined with respect to at least one of the third wall face, the fourth wall face, or the inclined face.

6. The liquid discharge head according to claim 1,
wherein the second recess has:
a narrow part close to the outer peripheral end; and
a wider part closer to the first recess than the narrow part,
the wider part having a width larger than a width of the narrow part in the width direction.

7. The liquid discharge head according to claim 1,
wherein at least one of the inner side face of the first recess, the first wall face of the second recess, or the second wall face of the second recess has asperities.

8. A liquid discharge apparatus comprising the liquid discharge head according to claim 1.

9. A bonded unit comprising:
a first component having a bonding face having a recess; and
a second component bonded to the bonding face of the first component,
wherein the recess includes:
a first recess to which an adhesive is applied, the first recess including an inner side face that is an interior of the first component; and
a second recess extending in an extending direction to connect the first recess and an outer peripheral end of the first component,
the second recess including:
a first wall face; and
a second wall face opposed to the first wall face,
the first wall face and the second wall face defining side walls of the second recess in a width direction orthogonal to the extending direction of the second recess, and
the extending direction of the second recess being inclined with respect to a perpendicular line perpendicular to the inner side face of the first recess.

10. The bonded unit according to claim 9,
wherein the inner side face has:
a third wall face; and
a fourth wall face adjacent to the third wall face with an angle with the third wall face,
the extending direction being inclined with respect to a perpendicular line perpendicular to at least one of the third wall face or the fourth wall face.

* * * * *